United States Patent
Li et al.

(10) Patent No.: US 10,902,153 B2
(45) Date of Patent: Jan. 26, 2021

(54) OPERATING A MOBILE DEVICE IN A LIMITED ACCESS MODE

(71) Applicant: INTERNATIONAL BUSINESS MACHINES CORPORATION, Armonk, NY (US)

(72) Inventors: Ying Li, Shanghai (CN); Jia Yu Hu, New Taipei (TW); Chi Yang Li, Beijing (CN); Fei Shen, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 75 days.

(21) Appl. No.: 16/022,804

(22) Filed: Jun. 29, 2018

(65) Prior Publication Data
US 2020/0004976 A1  Jan. 2, 2020

(51) Int. Cl.
*G06F 21/62* (2013.01)
*G06F 21/32* (2013.01)
*G06F 21/12* (2013.01)

(52) U.S. Cl.
CPC .......... *G06F 21/629* (2013.01); *G06F 21/121* (2013.01); *G06F 21/32* (2013.01)

(58) Field of Classification Search
CPC ...... G06F 21/629; G06F 21/32; G06F 21/121; G06F 21/6218
See application file for complete search history.

(56) References Cited

U.S. PATENT DOCUMENTS

| | | | |
|---|---|---|---|
| 9,495,550 B2 | 11/2016 | Anderson et al. | |
| 9,773,123 B2 * | 9/2017 | Karlson | H04L 63/102 |
| 9,846,790 B2 * | 12/2017 | Andersson | G06F 21/33 |
| 10,262,126 B2 | 4/2019 | Tussy | |
| 10,303,896 B2 | 5/2019 | Papakipos et al. | |
| 10,681,073 B2 | 6/2020 | Sofer et al. | |
| 2008/0020803 A1 * | 1/2008 | Rios | H04M 1/667 455/565 |
| 2008/0119179 A1 * | 5/2008 | Lay | H04M 1/6066 455/419 |

(Continued)

FOREIGN PATENT DOCUMENTS

| | | |
|---|---|---|
| CN | 105678255 A | 6/2016 |
| CN | 106126999 A | 11/2016 |

OTHER PUBLICATIONS

Karlson, Amy K. et al., "Can i borrow your phone?: understanding concerns when sharing mobile phones" CHI '09 Proceedings of the SIGCHI Conference on Human Factors in Computing Systems; ACM; Apr. 4-9, 2009; pp. 1647-1650.

*Primary Examiner* — Matthew Smithers
(74) *Attorney, Agent, or Firm* — Cantor Colburn LLP; Margaret McNamara

(57) ABSTRACT

Methods, systems and computer program products for operating a mobile device in a limited access mode are provided. Aspects include detecting an input from a user via an input device of the mobile device, the input configured to place the mobile device in the limited access mode. Aspects also include determining an active application of the mobile device at a time of the detected input and restricting the mobile device from performing one or more tasks based on the active application of the mobile device at the time of the detected input, wherein the one or more tasks include switching from the active application.

17 Claims, 3 Drawing Sheets

(56) References Cited

U.S. PATENT DOCUMENTS

| | | | |
|---|---|---|---|
| 2012/0084734 A1* | 4/2012 | Wilairat | G06F 21/36 |
| | | | 715/863 |
| 2012/0133484 A1* | 5/2012 | Griffin | G06F 21/51 |
| | | | 340/5.54 |
| 2012/0304280 A1* | 11/2012 | Hayashida | G06F 21/6218 |
| | | | 726/16 |
| 2014/0283012 A1* | 9/2014 | Eggerton | G06F 21/31 |
| | | | 726/19 |
| 2014/0283141 A1* | 9/2014 | Shepherd | G06F 3/0482 |
| | | | 726/30 |
| 2015/0074615 A1* | 3/2015 | Han | H04L 63/0861 |
| | | | 715/863 |
| 2015/0079943 A1* | 3/2015 | Williams | H04W 12/08 |
| | | | 455/411 |
| 2016/0050209 A1 | 2/2016 | Govande et al. | |
| 2016/0057278 A1* | 2/2016 | Desai | H04L 63/08 |
| | | | 455/411 |
| 2016/0335467 A1 | 11/2016 | Su et al. | |
| 2019/0116497 A1* | 4/2019 | Veramendi | G06F 1/1698 |

* cited by examiner

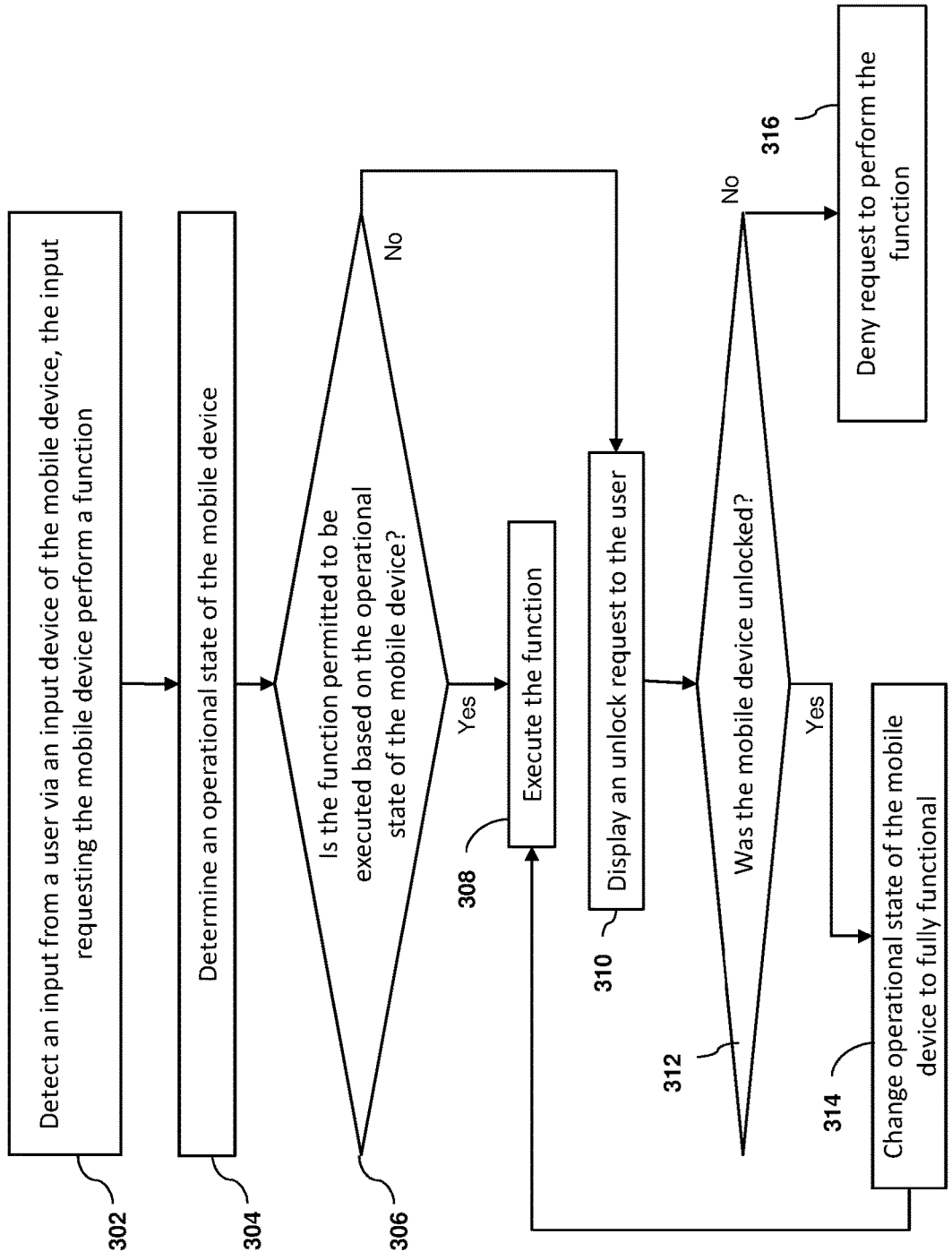

OPERATING A MOBILE DEVICE IN A LIMITED ACCESS MODE

BACKGROUND

The present invention relates generally to controlling a mobile device, and more specifically, to operating a mobile device in a limited access mode.

As mobile devices continue to become more powerful, and include additional functionality, these devices can contain more and more personal information, including photos, accounts of various apps and all kinds of payment information. The increase of personal, often sensitive data on mobile devices, can lead to users not allowing others access to their mobile device. For example, often a user wishes to show another person a photo on their mobile device but does not want to allow the other person access to other data stored on the mobile device, i.e., they do not want the other person to be able to view other pictures on their mobile device.

SUMMARY

An embodiment of a computer implemented method for operating a mobile device in a limited access mode is provided. The method includes detecting an input from a user via an input device of the mobile device, the input configured to place the mobile device in the limited access mode. The method also includes determining an active application of the mobile device at a time of the detected input and restricting the mobile device from performing one or more tasks based on the active application of the mobile device at the time of the detected input, wherein the one or more tasks include switching from the active application.

An embodiment of a mobile device configured to operate in a limited access mode includes an input device configured to receive an input from a user. The mobile device also includes a processor configured to perform detecting an input from a user via the input device of the mobile device, the input configured to place the mobile device in the limited access mode. The processor is also configured to perform determining an active application of the mobile device at a time of the detected input and restricting the mobile device from performing one or more tasks based on the active application of the mobile device at the time of the detected input, wherein the one or more tasks include switching from the active application.

An embodiment of a computer program product for performing a processing action includes a computer readable storage medium having program instructions embodied therewith, the program instructions readable by a processing circuit to cause the processing circuit to perform a method. The method includes detecting an input from a user via an input device of the mobile device, the input configured to place the mobile device in the limited access mode. The method also includes determining an active application of the mobile device at a time of the detected input and restricting the mobile device from performing one or more tasks based on the active application of the mobile device at the time of the detected input, wherein the one or more tasks include switching from the active application.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

FIG. 3 depicts a flow diagram of another method operating a mobile device in a limited access mode in accordance with an embodiment.

DETAILED DESCRIPTION

Apparatuses, systems, and methods are provided for operating a mobile device in a limited access mode. In one embodiment, a mobile device, such as a smartphone, is configured to detect an input from a user, such as a touch by a finger of the user, a touch by a plurality of fingers of the user, the press of a button, or a combination of two or more of these inputs. In response to detecting the input from the user, the mobile device is configured to enter a limited access mode of operation. When the mobile device enters the limited access mode, it accesses a user preferences file and determines what functions are permitted to be performed. The permitted functions are determined based on the user preferences file and based on which application was active when the input from the user to place the mobile device in limited access mode of operation was received.

Figure 1:
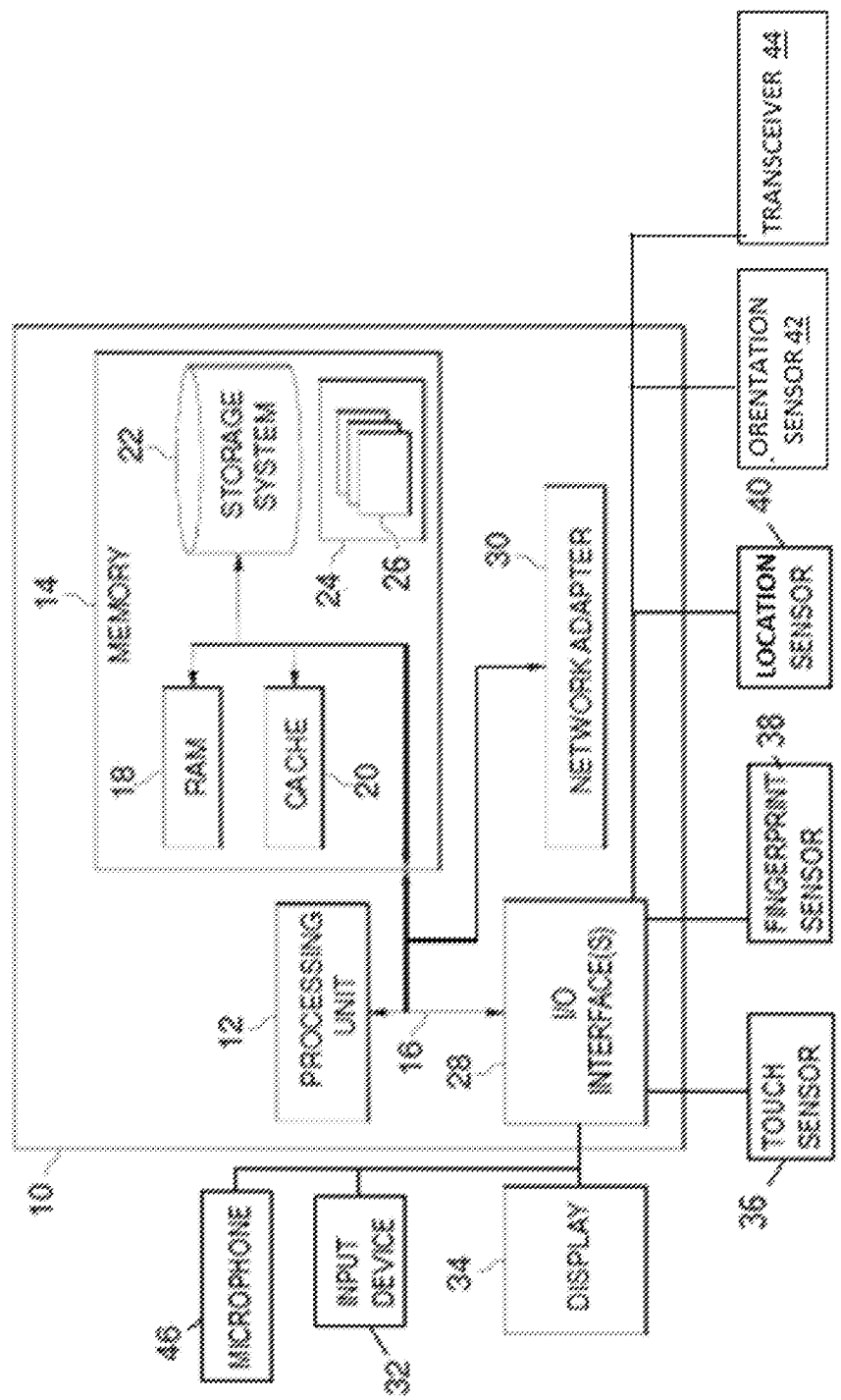
FIG. 1 depicts a block diagram of a mobile device in accordance with an embodiment.

Referring now to FIG. 1, an example of a mobile device 10 that can be used to perform various actions, including receiving and processing user inputs and performing various processing actions as described herein, including storing and processing data, executing programs and displaying information is shown. The mobile device 10 may be configured to receive or gather communications (e.g., data, text, spoken words, emails, authentication information, etc.) from other locations, such as a network (e.g., Internet) and/or another processor (e.g., server, computer or mobile device). The mobile device 10 may be any device capable of receiving user input, performing processing actions and displaying text and other information to a user, such as a mobile device (e.g., a smartphone), a wearable device (e.g., a smartwatch and/or fitness tracker), a tablet computer, a laptop computer, a desktop computer, a mainframe a server and others.

The mobile device 10 includes various components and/or modules for performing various processing, sensing and display functions. The mobile device 10 includes one or more processors or processing units 12, a memory 14, and a bus 16 that couples various components including the memory 14 to the processor 12.

The memory 14 includes computer readable media in the form of volatile memory, such as random access memory (RAM) 18 and/or cache memory 20. The mobile device 10 may also include other removable/non-removable, volatile/non-volatile computer system storage media. For example, the memory 14 includes storage 22 including a non-removable, non-volatile magnetic media (e.g., a hard drive), and/or removable storage media such as a memory card or flash drive. The memory 14 may include at least one program product having a set (e.g., at least one) of program modules that are configured to carry out the functions of embodiments described herein. For example, the memory 14 stores a program or utility suite 24 including one or more program modules 26 to carry out the functions and/or methodologies of embodiments described herein.

The mobile device 10 includes or is connected to various components, which may be incorporated in the mobile device 10 or external to the mobile device 10. The mobile device 10 includes interfaces 28 for communication with components and may also include a network adapter 30 for communication with other devices or components over a suitable network or remote connection. The mobile device 10 is connected to or includes at least one input device 32 such as a keyboard, button, mouse and/or touchscreen, and a display 34. The components shown in FIG. 1 and described herein are provided for illustrative purposes and are not intended to be limiting.

The mobile device 10 also includes a touch sensor 36 that is configured to detect contact and/or pressure from a user, e.g., via one or more fingers and/or other input devices such as styluses. The touch sensor 36 detects not only finger position, but also movements along a touchscreen. Movements of a finger or finger used an input to the mobile device 10 are referred to herein as movements, motions or swipes. In this way, the touch sensor 36 may be used by the mobile device 10, e.g., in conjunction with other input devices and program modules 26, to recognize an input performed by a user.

As described herein, an input refers to any interaction between a user and a touchscreen or other input device. An input may be a touch at some location on the touchscreen by an object (e.g., one or more fingers), a movement or swipe of the touching object or a combination thereof. The movement may include an extent (e.g., the distance along a path of the touch), speed and/or path of the movement along the touchscreen. Other aspects of an input may include, for example, an amount of pressure, a number of touches (e.g., single "click" or double click), and any other criteria that may be used to discern the nature of the input and differentiate it relative to other inputs.

Any suitable type of touch sensor 36 may be included in the device. For example, the touch sensor 36 is a capacitive or acoustic wave sensor. The touch sensor 36 may be located under a touchscreen or embedded within the touchscreen (e.g., between screen layers).

The mobile device 10 also includes a biometric finger pattern sensor 38 that is configured to detect characteristics of the user's fingers, such as a fingerprint, portion of a fingerprint, or another characteristic that allows, e.g., identification of a user and/or differentiation between the individual fingers of a user. Such characteristics, whether utilized individually or in combination, are referred to herein as "finger patterns." A "finger pattern" refers to any detectable feature or features, or any other identifying information detected by the finger pattern sensor that can be used to identify characteristics of individual fingers of a user's hand and/or differentiate between fingers.

Although the finger pattern sensor 38 may be configured solely to detect fingerprints or other finger patterns, it may also detect other characteristics of a user, such as a temperature, vein pattern, and heartrate. One or more of these additional characteristics may be used in conjunction with fingerprint patterns to identify a user and/or differentiate between a user's fingers. An example of a fingerprint pattern sensor is a capacitive sensor. The finger pattern sensor 38, in one example, is embedded in or below a touchscreen or a portion of a touchscreen.

In addition to finger pattern information, one or more sensors can be included for measuring other biometric information, such as types of finger movement (e.g., swiping, finger pressure, finger rolling), and vital signs (e.g., heart rate and temperature). It is noted that the touch sensor and fingerprint sensor may be configured as individual sensors or sensor assemblies, or integrated into a common sensor assembly that is used by various processing modules to detect gestures and analyze fingerprint patterns.

Various other components may be incorporated in the mobile device 10. For example, a location sensor 40 can be used for determining the location of the mobile device 10. An orientation sensor 42 can be used for determining the orientation of the mobile device 10. The orientation can include whether the mobile device is in a landscape or portrait orientation and can also include determining if the mobile device is being held by the user. The transceiver 44 is configured to directly communicate with one or more electronic devices via any known protocol, such a Bluetooth. The one or more electronic devices can include a speaker or headset, a smartwatch, a television, a computer, an automobile, or the like. A microphone 46 or other sound recording device may be included for recording voice commands and recording changes in voice or other audible indicators.

In exemplary embodiments, all or a portion of the display area is configured both as a touchscreen and a finger pattern sensor. For example, capacitive detection circuitry is embedded under or within the screen to allow for detection of both touches as well as detection of finger patterns (e.g., fingerprints, portions of fingerprints and/or feature combinations associated with fingerprints). Detection of finger patterns provides functionality to identify a user for authentication or security purposes and to differentiate between different fingers of a user's hand. Furthermore, the finger pattern sensor may be configured to allow for detection of different portions of an individual finger, so that inputs such as finger rolling can be identified and/or different portions of an individual finger can be associated with different respective actions (e.g., using the side of a finger can denote a different action than using the finger in a normal manner). A finger pattern sensor can also be incorporated into other input devices, such as in one or more buttons. In this way, buttons can be given additional functionality by inputting different commands based on which finger is being used to press a button.

In one embodiment, the mobile device 10 is configured to, in response to detecting an input by a user (e.g., by detecting contact between a user's finger or fingers), enter a limited access mode. The limited access mode limits the functions that are able to be performed by the mobile device based on the application that was running at the time that the input was detected. In exemplary embodiments, the mobile device can store a user preference file that includes the permitted functions for each application during the limited access mode. For example, if the current application is an image viewing application, the limited access mode may limit the functions to zooming in and out of the picture being displayed, i.e., the ability to exit the imaging viewing application or to browse to another image on the device are restricted. Once placed in the limited access mode, the mobile device 10 will remain in the limited access mode until the user successfully unlocks the mobile device 10 by using any traditional unlocking mechanism, such as entering an unlock code, scanning a fingerprint, using facial recognition, or the like.

Figure 2:
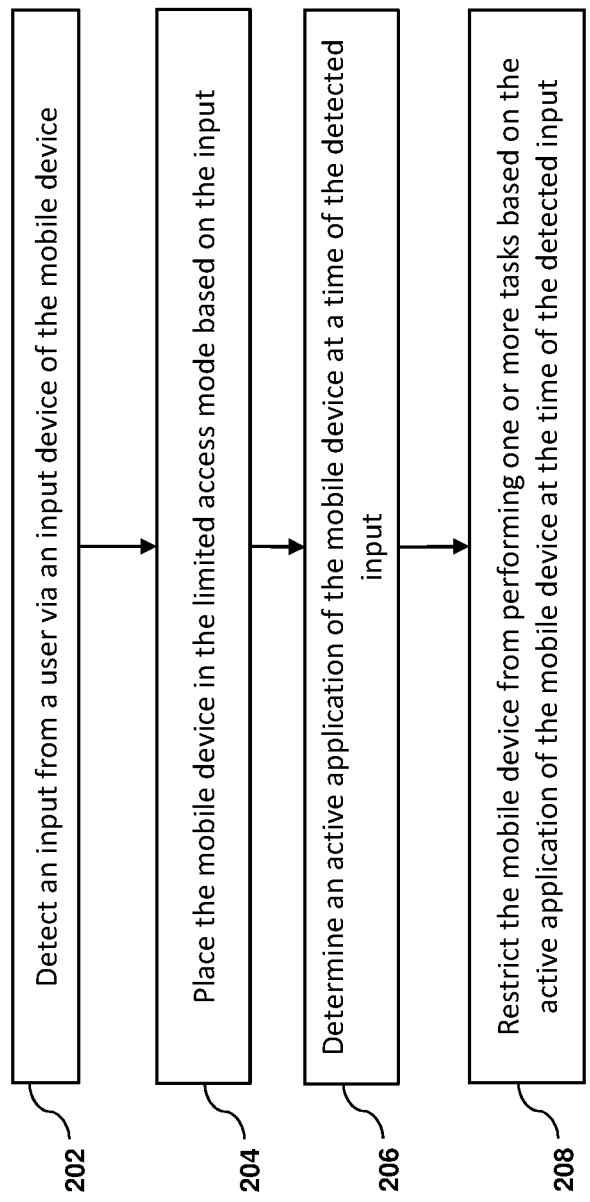
FIG. 2 depicts a flow diagram of a method for operating a mobile device in a limited access mode in accordance with an embodiment.

Referring now to FIG. 2 an embodiment of a method 200 for operating a mobile device in a limited access mode is shown. As illustrated at block 202, the method 200 includes detecting an input from a user via an input device of the mobile device. Next, as shown at block 204, the method 200 includes placing the mobile device into a limited access mode. The method 200 also includes determining an active application of the mobile device at a time of the detected input, as shown at block 206. Next, as shown at block 208, the method 200 includes restricting the mobile device from performing one or more tasks based on the active application of the mobile device at the time of the detected input. The mobile device is restricted from exiting the application that was active at the time that the device was entered into the limited access mode. In addition, the mobile device is only permitted to perform a limited set of functions that are determined based on the active application at the time that the mobile device was placed into the limited access mode. This permitted set of functions can be configured by the user or can be default functions that are specified by the developer of the applications. In one embodiment, the user can store a set of user preference on the mobile device that specifies which functions are permitted to be executed by the active applications when the mobile device is in the limited access mode. In exemplary embodiments, the mobile device remains in the limited access mode until the mobile device is successfully unlocked.

In one embodiment, based on a determination that the active application is a photo or image viewing application when the mobile device is placed into the limited access mode, the mobile device is configured to identify a content item displayed on a screen of the mobile device at the time of the detected input and to limit an operational functionality of the mobile device to manipulating the content item, i.e., zooming in and out. Accordingly, a person accessing the mobile device will not be able to browse through other images, or content items, stored on the mobile device.

In one embodiment, based on a determination that the active application is an application that includes in-app purchases, the mobile device is configured to prevent in-app purchases from being made when in the limited access mode. Such applications can include shopping applications for various stores, gaming applications that have in-app purchases, and the like. Accordingly, a person accessing the mobile device will be able to play the game or browse through the active shopping application on the mobile device but will not be able to make purchases in the application. Likewise, the person will not be able to review previous purchases made by the user of the mobile device.

FIG. 3 illustrates an embodiment of a method 300 operating a mobile device in a limited access mode. As illustrated at block 302, the method 300 includes detecting an input from a user via an input device of the mobile device, wherein the input is requesting that the mobile device perform a function. Next, as shown at block 304, the method 300 includes determining an operational state of the mobile device. The operational state of the mobile device can be fully functional, locked, or limited access mode. As shown at decision block 306, the method 300 includes determining if the function requested is permitted to be executed based on the operational state of the mobile device. If the function requested is permitted to be executed, the method 300 proceeds to block 308 and executes the function. Otherwise, the method 300 proceeds to block 310 and displays an unlock request to the user. In exemplary embodiments, the unlock request display may request the user to enter a password, scan a fingerprint, or capture an image of their face to unlock the mobile device. As shown at decision block 312, the method 300 includes determining if the mobile device was successfully unlocked. If the mobile device was not successfully unlocked, the method 300 proceeds to block 316 and denies the request to perform the function. Otherwise, the method 300 proceeds to block 314 and changes the operational state of the mobile device to fully functional. The method 300 then proceeds to block 308 and executes the function.

Technical effects and benefits include the ability for a mobile device to perform a large number of individually identifiable processing actions while requiring minimal inputs by a user. Use of finger identification or differentiation greatly increases the number of distinct inputs and commands that may be applied to a given input device.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of operating a mobile device in a limited access mode, the method comprising:
    detecting an input from a user via an input device of the mobile device, the input configured to place the mobile device in the limited access mode;
    determining an active application of the mobile device at a time of the detected input; and
    restricting the mobile device from performing one or more tasks based on the active application of the mobile device while the mobile device is in the limited access mode, wherein the one or more tasks include switching from the active application and making any purchases in the active application.

2. The method of claim 1, further comprising identifying a content item displayed on a screen of the mobile device at the time of the detected input; and
    limiting an operational functionality of the mobile device to manipulating the content item.

3. The method of claim 1, further comprising receiving an unlock command from the user and restoring a full functionality of the mobile device.

4. The method of claim 3, wherein the unlock command is one of a unlock code, a fingerprint image, or a facial recognition scan.

5. The method of claim 1, further comprising obtaining and enforcing stored user preferences for the limited access mode and the active application.

6. The method of claim 5, wherein the stored user preferences includes an identification of functions that are permitted to be performed by the mobile device in the limited access mode based on the active application at the time the mobile device entered the limited access mode.

7. A mobile device for performing a processing action, the mobile device comprising:
a sensor configured to receive an input from a user; and
a processor configured to perform:
detecting an input from a user via an input device of the mobile device, the input configured to place the mobile device in a limited access mode;
determining an active application of the mobile device at a time of the detected input; and
restricting the mobile device from performing one or more tasks based on the active application of the mobile device while the mobile device is in the limited access mode, wherein the one or more tasks include switching from the active application and making any purchases in the active application.

8. The mobile device of claim 7, wherein the processor is further configured to perform:
identifying a content item displayed on a screen of the mobile device at the time of the detected input; and
limiting an operational functionality of the mobile device to manipulating the content item.

9. The mobile device of claim 7, wherein the processor is further configured to perform receiving an unlock command from the user and restoring a full functionality of the mobile device.

10. The mobile device of claim 9, wherein the unlock command is one of a unlock code, a fingerprint image, or a facial recognition scan.

11. The mobile device of claim 7, wherein the processor is further configured to perform obtaining and enforcing stored user preferences for the limited access mode and the active application.

12. The mobile device of claim 11, wherein the stored user preferences includes an identification of functions that are permitted to be performed by the mobile device in the limited access mode based on the active application at the time the mobile device entered the limited access mode.

13. A computer program product for performing a processing action, the computer program product comprising:
a computer readable storage medium having program instructions embodied therewith, wherein the computer readable storage medium is not a signal, the program instructions readable by a processing circuit to cause the processing circuit to perform a method comprising:
detecting an input from a user via an input device of a mobile device, the input configured to place the mobile device in a limited access mode;
determining an active application of the mobile device at a time of the detected input; and
restricting the mobile device from performing one or more tasks based on the active application of the mobile device while the mobile device is in the limited access mode, wherein the one or more tasks include switching from the active application and making any purchases in the active application.

14. The computer program product of claim 13, wherein the method further comprises:
identifying a content item displayed on a screen of the mobile device at the time of the detected input; and
limiting an operational functionality of the mobile device to manipulating the content item.

15. The computer program product of claim 13, wherein the method further comprises receiving an unlock command from the user and restoring a full functionality of the mobile device.

16. The computer program product of claim 15, wherein the unlock command is one of a unlock code, a fingerprint image, or a facial recognition scan.

17. The computer program product of claim 13, wherein the method further comprises obtaining and enforcing stored user preferences for the limited access mode and the active application.

* * * * *